(12) United States Patent
Tian et al.

(10) Patent No.: US 11,856,581 B2
(45) Date of Patent: Dec. 26, 2023

(54) MULTI-PHYSICAL DOWNLINK SHARED CHANNEL GRANT CONFIGURATION

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Tao Luo, San Diego, CA (US); Wooseok Nam, San Diego, CA (US); Ahmed Abdelaziz Ibrahim Abdelaziz Zewail, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 128 days.

(21) Appl. No.: 17/136,929

(22) Filed: Dec. 29, 2020

(65) Prior Publication Data

US 2022/0210820 A1 Jun. 30, 2022

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
None
See application file for complete search history.

(56) References Cited

U.S. PATENT DOCUMENTS

| | | | | |
|---|---|---|---|---|
| 2019/0230689 A1* | 7/2019 | Cao | ...................... | H04L 27/2602 |
| 2019/0306857 A1* | 10/2019 | Lin | ........................ | H04L 5/0007 |
| 2019/0312713 A1* | 10/2019 | Yang | ...................... | H04W 72/23 |
| 2020/0214006 A1* | 7/2020 | Choi | ...................... | H04L 1/1861 |
| 2020/0313793 A1* | 10/2020 | Jung | ...................... | H04L 5/0094 |
| 2021/0105809 A1* | 4/2021 | Park | ...................... | H04L 27/2602 |
| 2021/0112583 A1* | 4/2021 | Gao | ...................... | H04L 5/0044 |

(Continued)

FOREIGN PATENT DOCUMENTS

| | | | | |
|---|---|---|---|---|
| EP | 3754876 A1 * | 12/2020 | ........... | H04L 1/1628 |
| WO | WO-2020032695 A1 * | 2/2020 | ............... | H04L 1/08 |
| WO | WO-2020222625 A1 * | 11/2020 | ............. | H04L 5/001 |

OTHER PUBLICATIONS

Wilus Inc. "Remaining Issues on DL SPS for NR URLLC", Apr. 20-30, 2020, R1-2002638 submitted as prior art in the IDS dated Jun. 24, 2022 (Year: 2022).*

(Continued)

*Primary Examiner* — Jamaal Henson
(74) *Attorney, Agent, or Firm* — Harrity & Harrity, LLP

(57) ABSTRACT

Various aspects of the present disclosure generally relate to wireless communication. In some aspects, a user equipment (UE) may receive a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol. The UE may monitor for at least one PDSCH transmission, of the set of PDSCH transmissions, in accordance with the PDSCH grant. Numerous other aspects are described.

30 Claims, 9 Drawing Sheets

(56) References Cited

U.S. PATENT DOCUMENTS

2021/0153185 A1* 5/2021 Schober ............... H04L 1/1621
2022/0061076 A1* 2/2022 Ma ....................... H04L 5/0055

OTHER PUBLICATIONS

3GPP TS 36.321 vers.13.2.0 (Jun. 2016) "3rd Generation Partnership Project; Technical Specification Group Radio Access Network; Evolved Universal Terrestrial Radio Access (E-UTRA); Medium Access Control (MAC) protocol specification (Release 13)" (Year: 2016).*

3GPP TS 36.321 vers.13.2.0 (Jun. 2016) "3rd Generation Partnership Project; Technical Specification Group Radio Access Network; Evolved Universal Terrestrial Radio Access (E-UTRA); Medium Access Control (MAC) protocol specification (Release 13)" dated Jun. 2013 (Year: 2013).*

International Search Report and Written Opinion—PCT/US2021/073004—ISA/EPO—dated May 2, 2022.

Moderator (LG Electronics): "Summary#2 on Maintenance of other Aspects for URLLC/IIOT", 3GPP TSG RAN WG1 #100bis, 3GPP Draft, R1-2002721, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 18, 2020 (Apr. 18, 2020), 30 Pages, XP051876676, Retrieved from the Internet: URL: https://ftp.3gpp.org/tsg_ran/WG1_RL1/TSGR1_100b_e/Docs/R1-2002721.zip, R1-2002721, Summary#2 of 7.2.5.7 others.docx [retrieved on Apr. 18, 2020], p. 2.

Wilus Inc: "Remaining Issues on DL SPS for NR URLLC", 3GPP TSG RAN WG1 #100bis, 3GPP Draft, R1-2002638, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 11, 2020 (Apr. 11, 2020), 4 Pages, XP051875730, Retrieved from the Internet: URL: https://ftp.3gpp.org/tsg_ran/WG1_RL1/TSGR1_100b_e/Docs/R1-2002638.zip, R1-2002638_SPS_final.docx [retrieved on Apr. 11, 2020], Section 2.

* cited by examiner

MULTI-PHYSICAL DOWNLINK SHARED CHANNEL GRANT CONFIGURATION

FIELD OF THE DISCLOSURE

Aspects of the present disclosure generally relate to wireless communication and to techniques and apparatuses for multi-physical downlink shared channel (PDSCH) grant configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors operatively coupled to the memory, the memory and the one or more processors configured to: receive a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and monitor for at least one PDSCH transmission, of the set of PDSCH transmissions, in accordance with the PDSCH grant.

In some aspects, a method of wireless communication performed by a UE includes receiving a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol; and monitoring for at least one PDSCH transmission, of the set of PDSCH transmissions, in accordance with the PDSCH grant.

In some aspects, a non-transitory computer-readable medium storing a set of instructions for wireless communication includes one or more instructions that, when executed by one or more processors of a UE, cause the UE to: receive a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol; and monitor for at least one PDSCH transmission, of the set of PDSCH transmissions, in accordance with the PDSCH grant.

In some aspects, an apparatus for wireless communication includes means for receiving a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol; and means for monitoring for at least one PDSCH transmission, of the set of PDSCH transmissions, in accordance with the PDSCH grant.

In some aspects, a method of wireless communication performed by a base station includes transmitting a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and transmitting at least one PDSCH transmission, of the set of PDSCH transmissions, in accordance with the PDSCH grant.

In some aspects, a base station for wireless communication includes a memory; and one or more processors operatively coupled to the memory, the memory and the one or more processors configured to: transmit a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and transmit at least one PDSCH transmission, of the set of PDSCH transmissions, in accordance with the PDSCH grant.

In some aspects, a non-transitory computer-readable medium storing a set of instructions for wireless communication includes one or more instructions that, when executed by one or more processors of a base station, cause the base station to: transmit a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and transmit at least one PDSCH transmission, of the set of PDSCH transmissions, in accordance with the PDSCH grant.

In some aspects, an apparatus for wireless communication includes means for transmitting a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and means for transmitting at least one PDSCH transmission, of the set of PDSCH transmissions, in accordance with the PDSCH grant.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
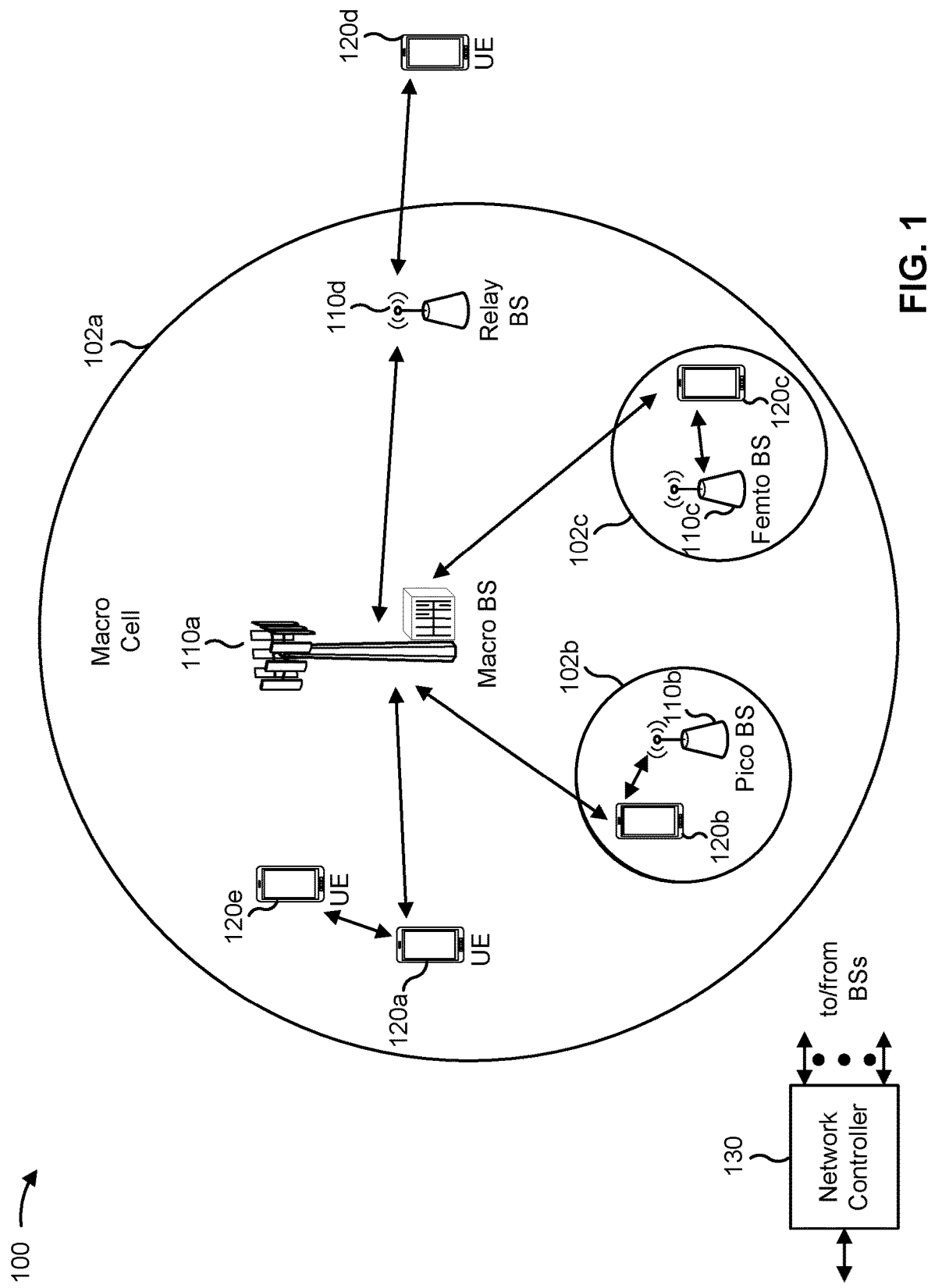
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
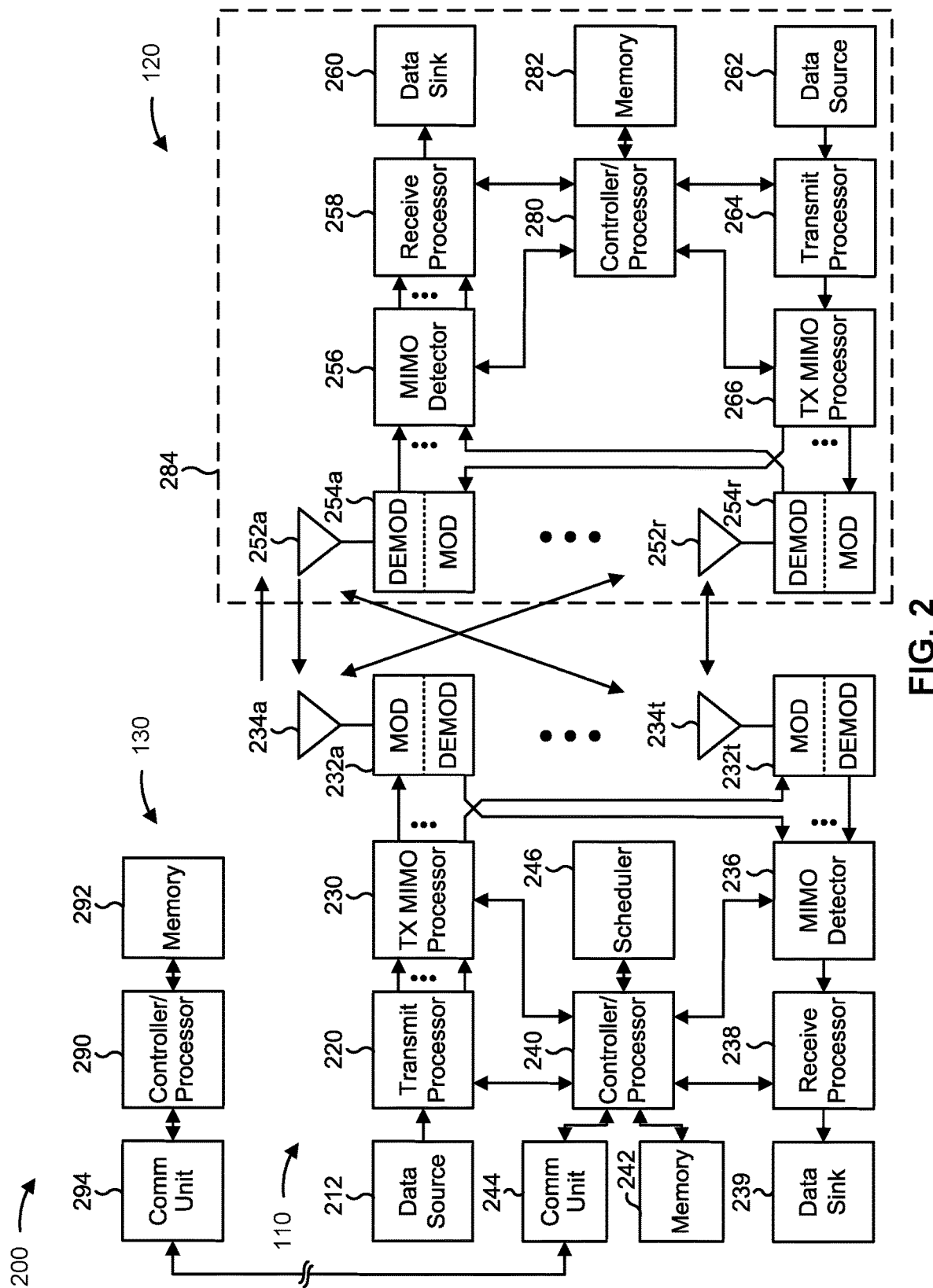
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with multi-physical downlink shared channel (PDSCH) grant configuration, as described in more detail elsewhere herein. For example, controller/processor 240 of base station 110, controller/processor 280 of UE 120, and/or any other component(s) of FIG. 2 may perform or direct operations of, for example, process 600 of FIG. 6 or process 800 of FIG. 8, among other examples. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 or process 800 of FIG. 8, among other examples. In some aspects, executing instructions may include running the instructions, converting the instructions, compiling the instructions, and/or interpreting the instructions, among other examples.

In some aspects, a UE includes means for receiving a PDSCH grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; or means for monitoring for at least one PDSCH transmission, of the set of PDSCH transmissions, in accordance with the PDSCH grant. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a scheduling error based at least in part on the at least one OFDM symbol conflicting with the semi-static uplink symbol.

In some aspects, the UE includes means for canceling reception of the one or more PDSCH transmissions based at least in part on the at least one OFDM symbol overlapping with the semi-static uplink symbol; or means for monitoring for at least one PDSCH transmission based at least in part on cancelling reception of the one or more PDSCH transmissions.

In some aspects, the UE includes means for delaying reception of the one or more PDSCH transmissions and one or more scheduled PDSCH transmissions subsequent to the one or more PDSCH transmissions based at least in part on the at least one OFDM symbol overlapping with the semi-static uplink symbol; or means for monitoring for the set of PDSCH transmissions based at least in part on delaying reception of the one or more PDSCH transmissions and the one or more scheduled PDSCH transmission subsequent to the one or more PDSCH transmissions.

In some aspects, the UE includes means for delaying the reception for one slot.

In some aspects, the UE includes means for canceling reception of a last PDSCH transmission of the one or more PDSCH transmissions and one or more scheduled PDSCHs subsequent to the one or more PDSCH transmissions.

In some aspects, the UE includes means for adjusting the SLIV of the one or more PDSCH transmissions based at least in part on the at least one OFDM symbol overlapping with the semi-static uplink symbol; or means for monitoring for the set of PDSCH transmissions based at least in part on adjusting the SLIV.

In some aspects, the UE includes means for segmenting a set of OFDM symbols identified by the SLIV into a set of segments; or means for skipping one or more segments for monitoring for the set of PDSCH transmissions.

In some aspects, a BS includes means for transmitting a PDSCH grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; or means for transmitting at least one PDSCH transmission, of the set of PDSCH transmissions, in accordance with the PDSCH grant. The means for the BS to perform operations described herein may include, for example, one or more of antenna 234, demodulator 232, MIMO detector 236, receive processor 238, transmit processor 220, TX MIMO processor 230, modulator 232, controller/processor 240, or memory 242.

In some aspects, the BS includes means for determining a scheduling error based at least in part on the at least one OFDM symbol conflicting with the semi-static uplink symbol. The BS may cancel transmitting the grant and the PDSCH transmission based at least in part on determining the scheduling error.

In some aspects, the BS includes means for canceling transmission of the one or more PDSCH transmissions based at least in part on the at least one OFDM symbol overlapping with the semi-static uplink symbol; or means for transmitting at least one PDSCH transmission based at least in part on cancelling transmission of the one or more PDSCH transmissions.

In some aspects, the BS includes means for delaying transmission of the one or more PDSCH transmissions and one or more scheduled PDSCH transmissions subsequent to the one or more PDSCH transmissions based at least in part on the at least one OFDM symbol overlapping with the semi-static uplink symbol; or means for transmitting the set of PDSCH transmissions based at least in part on delaying transmission of the one or more PDSCH transmissions and the one or more scheduled PDSCH transmission subsequent to the one or more PDSCH transmissions.

In some aspects, the BS includes means for delaying the transmission for one slot.

In some aspects, the BS includes means for canceling transmission of a last PDSCH transmission of the one or more PDSCH transmissions and one or more scheduled PDSCHs subsequent to the one or more PDSCH transmissions.

In some aspects, the BS includes means for adjusting the SLIV of the one or more PDSCH transmissions based at least in part on the at least one OFDM symbol overlapping with the semi-static uplink symbol; or means for monitoring for the set of PDSCH transmissions based at least in part on adjusting the SLIV.

In some aspects, the BS includes means for segmenting a set of OFDM symbols identified by the SLIV into a set of segments; or means for skipping one or more segments for transmitting the set of PDSCH transmissions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, a single uplink grant can schedule a plurality of continuous uplink transmissions. For example, 3GPP Release 16 (Rel. 16) version (v.) 16.4.0 Technical Specification (TS) 38.212 includes a multiple physical uplink shared channel (PUSCH) (multi-PUSCH) grant feature, in connection with downlink control information (DCI) format 0-1, where a UE may use a single uplink grant for a plurality of continuous PUSCH transmissions. In this case, the plurality of continuous PUSCH transmissions may have a set of common parameters. For example, each of the plurality of continuous PUSCH transmissions, may use the same frequency domain resource assignment (FDRA), the same modulation and coding scheme (MCS), or the same rank, among other examples.

For the plurality of continuous PUSCH transmissions, a UE may determine a starting and/or ending position based at least in part on a SLIV in a time domain resource assignment (TDRA) entry. The multi-PUSCH grant may indicate a first hybrid automatic repeat request (HARQ) process identifier (ID) for a first uplink transmission and the UE may determine subsequent HARQ process IDs by incrementing the first HARQ process ID. In some cases, each PUSCH of the plurality of continuous PUSCH transmissions may be associated with a respective new data indicator (NDI) or redundancy version (RVID). Use of multi-PUSCH grants may provide reduced signaling overhead while maintaining scheduling flexibility and downlink control information (DCI) flexibility.

Multiple PDSCH (multi-PDSCH) grants can be introduced to provide similar overhead reduction for downlink scheduling. In some techniques, a multi-PDSCH grant may include a set of SLIVs that do not conflict with any semi-static uplink symbols. However, in some cases, a SLIV of a PDSCH may conflict with a semi-static uplink symbol. Some aspects described herein provide handling for cases where a SLIV of a PDSCH in a multi-PDSCH grant conflicts with a semi-static uplink symbol. For example, in some aspects, a UE may treat a conflict between a SLIV of a PDSCH and a semi-static uplink symbol as an error case. Alternatively, the UE may cancel or delay a PDSCH corresponding to the SLIV that conflicts with the semi-static uplink symbol. Alternatively, the UE may adjust the SLIV that conflicts with the semi-static uplink symbol (and the associated PDSCH) to resolve the conflict. In this way, the UE handles a conflict between a SLIV of a PDSCH in a multi-PDSCH grant and a semi-static uplink symbol, thereby enabling use of multi-PDSCH grants to reduce overhead.

Figure 3:
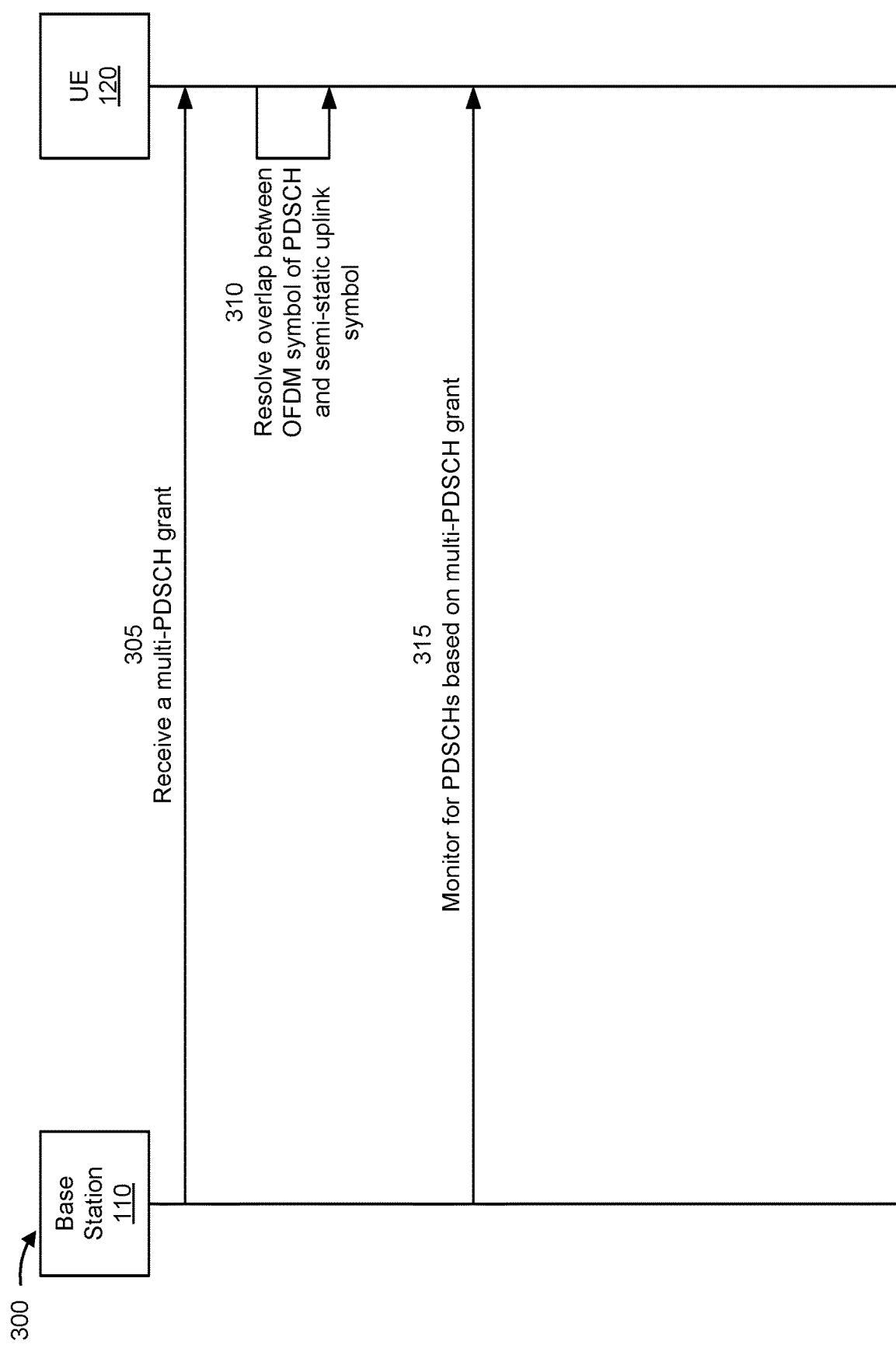
FIGS. 3-5 are diagrams illustrating examples associated with multi-physical downlink shared channel (PDSCH) grant configuration, in accordance with various aspects of the present disclosure.

FIG. 3 is a diagram illustrating an example 300 associated with multi-PDSCH grant configuration, in accordance with various aspects of the present disclosure. As shown in FIG. 3, a base station 110 and a UE 120 may communicate with one another.

As show by reference number 305, UE 120 may receive a PDSCH grant scheduling a set of PDSCH transmissions. For example, UE 120 may receive a multi-PDSCH grant that includes a set of SLIVs for a set of PDSCH transmissions. In some aspects, at least one of the SLIVs identifies an OFDM symbol that overlaps with a semi-static uplink symbol. In this case, UE 120 may determine that a conflict exists between the SLIV (and a PDSCH associated therewith) and the semi-static uplink symbol. In some aspects, UE 120 may receive the multi-PDSCH grant in a DCI message.

As shown by reference number 310, UE 120 may resolve the identified conflict between the SLIV and the semi-static uplink symbol. For example, UE 120 may treat an overlap between an OFDM symbol identified by a SLIV and a semi-static uplink symbol as an error case. In this case, UE 120 may return an error, cancel monitoring, and/or the like.

In some aspects, UE 120 may cancel or delay reception of a PDSCH that includes the OFDM symbol. For example, UE 120 may cancel or delay reception of a PDSCH that includes the OFDM symbol. Additional details regarding canceling or delaying reception of a PDSCH are described with regard to FIG. 4. In some aspects, UE 120 may adjust a SLIV of a PDSCH that includes an OFDM symbol which overlaps with a semi-static uplink symbol. For example, UE 120 may adjust the SLIV, such that some OFDM symbols of the SLIV are used for the PDSCH and one or more OFDM symbols that overlap with or are within a threshold proximity of the semi-static uplink symbol are not used for the PDSCH. For example, when a SLIV identifies symbols 0-13 of a slot and symbol 5 has a conflict with an uplink symbol, symbols 3-7 may not be used for a PDSCH to enable UE 120 to switch between downlink reception or uplink transmission. In some aspects, only the overlapping symbol may not be used. In some aspects, a quantity of symbols other than the overlapping symbol may be based at least in part on a UE capability (e.g., an amount of time for UE 120 to switch between uplink transmission and downlink reception). Additional details regarding adjusting a SLIV of a PDSCH are described with regard to FIG. 5.

As shown by reference number 315, UE 120 may monitor for and receive one or more PDSCHs based at least in part on the multi-PDSCH grant and based at least in part on resolving the identified conflict. For example, UE 120 may monitor for and receive a PDSCH that does not include an OFDM symbol that conflicts with a semi-static uplink symbol. Additionally, or alternatively, UE 120 may monitor for and receive a PDSCH that does include an OFDM symbol that overlaps with a semi-static uplink symbol based at least in part on delaying the PDSCH or adjusting the SLIV, among other examples.

As indicated above, FIG. 3 is provided as an example. Other examples may differ from what is described with respect to FIG. 3.

Figure 4:
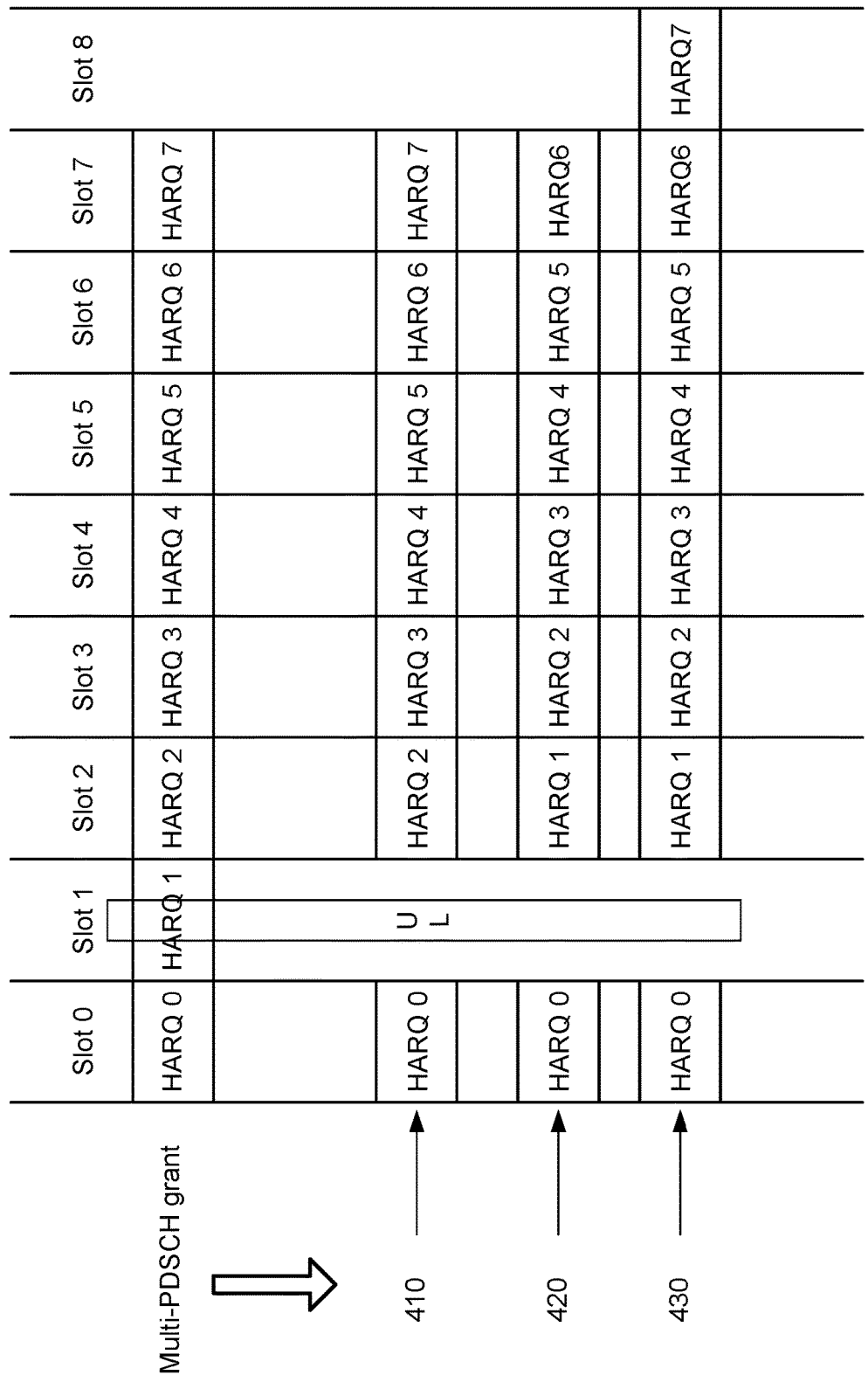

FIG. 4 is a diagram illustrating an example 400 associated with multi-PDSCH grant configuration, in accordance with various aspects of the present disclosure. Example 400 includes communication between a BS 110 and a UE 120 in connection with an overlap between an OFDM symbol in a PDSCH and a semi-static uplink symbol, as described above with regard to FIG. 3.

As shown in FIG. 4, HARQ process IDs 0 through 7 are scheduled for slots 0 through 7 based at least in part on a multi-PDSCH grant. In this case, a PDSCH corresponding to HARQ process ID 1 conflicts with one or more uplink semi-static symbols in slot 1 (an OFDM symbol of the PDSCH overlaps with an uplink semi-static symbol in slot 1). In a first aspect 410, UE 120 may cancel the PDSCH corresponding to HARQ process ID 1 and may transmit the PDSCHs corresponding to HARQ process IDs 0, 2, 3, 4, 5, 6, and 7. In other words, in the first aspect 410, UE 120 cancels the PDSCH with the overlapping OFDM symbol without adjusting other PDSCHs of the multi-PDSCH grant. In this way, UE 120 avoids changing any PDSCHs for which there is not an overlapping OFDM symbol.

In a second aspect 420, UE 120 may cancel a PDSCH corresponding to HARQ process ID 7 and may transmit the PDSCHs corresponding to HARQ process IDs 0 through 6. In other words, rather than cancel the PDSCH with the overlapping OFDM symbol (e.g., the PDSCH corresponding to HARQ process ID 1), UE 120 pushes back the PDSCHs to avoid overlapping with the semi-static uplink symbol and cancels one or more last PDSCHs. In this way, UE 120 avoids extending the multi-PDSCH grant beyond slot 7 for which the multi-PDSCH grant is scheduled.

In a third aspect 430, UE 120 may delay PDSCHs rather than canceling a PDSCH as a response to identifying a PDSCH with an overlapping symbol. In other words, UE 120 pushes back the PDSCHs and extends the multi-PDSCH grant to slot 8 to ensure reception of all PDSCHs of the multi-PDSCH grant. In this way, UE 120 avoids dropping a PDSCH corresponding to a HARQ process identifier as a response to identifying a conflict with an uplink semi-static symbol. Although some aspects are described in terms of a single conflicting PDSCH and a single response, multiple conflicting PDSCHs or multiple responses may be possible. For example, UE 120 may cancel multiple PDSCHs with conflicting OFDM symbols or cancel a first PDSCH with a conflicting OFDM symbol and delay a second PDSCH with a conflicting OFDM symbol, among other examples. In some aspects, UE 120 may delay multiple sets of PDSCHs. For example, when UE 120 detects a first overlap at slot 1, UE 120 may delay PDSCHs 1 through 7 to slots 2 through 8 and UE 120 may detect a second overlap at slot 5 and, accordingly, delay PDSCHs in slots 5 through 8 to slots 6 through 9.

As indicated above, FIG. 4 is provided as an example. Other examples may differ from what is described with respect to FIG. 4.

Figure 5:
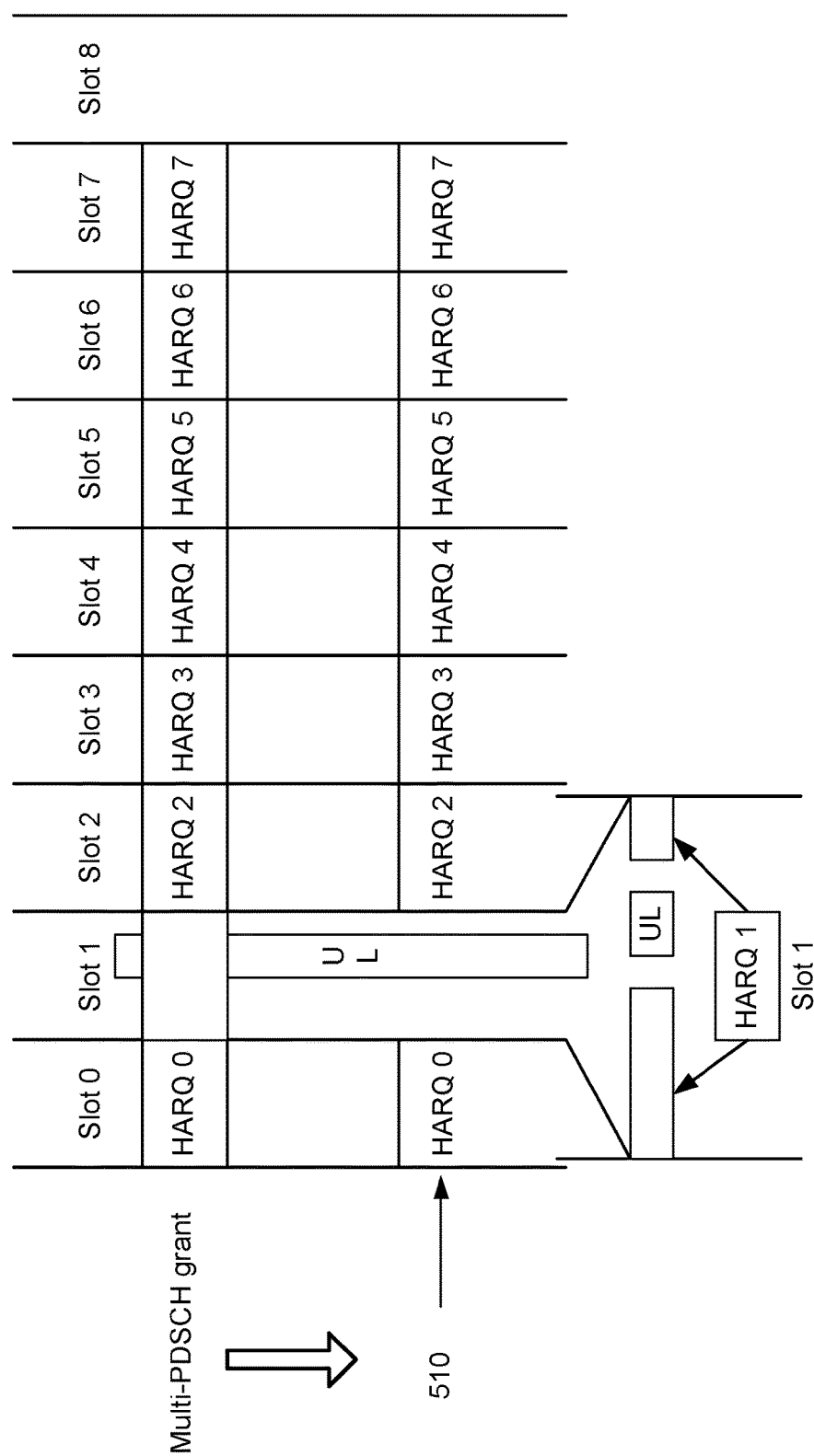

FIG. 5 is a diagram illustrating an example 500 associated with multi-PDSCH grant configuration, in accordance with various aspects of the present disclosure. Example 500 includes communication between a BS 110 and a UE 120 in connection with an overlap between an OFDM symbol in a PDSCH and a semi-static uplink symbol, as described above with regard to FIG. 3.

As shown in FIG. 5, HARQ process IDs 0 through 7 are scheduled for slots 0 through 7 based at least in part on a multi-PDSCH grant. In this case, a PDSCH corresponding to HARQ process ID 1 conflicts with one or more uplink semi-static symbols in slot 1 (an OFDM symbol of the PDSCH overlaps with an uplink semi-static symbol in slot 1). In a first aspect 510, UE 120 may segment a set of symbols in a SLIV for the PDSCH corresponding to HARQ process ID 1 and skip one or more segments. For example, UE 120 may determine to skip a first segment that includes an OFDM symbol that overlaps with the semi-static uplink symbol. In some aspects, UE 120 may keep one or more second segments that do not include an OFDM symbol that overlaps with the semi-static uplink symbol. For example, as shown, UE 120 may keep a second segment before the semi-static uplink symbol and a second segment after the semi-static uplink symbol. In this case, UE 120 may monitor for the PDSCH in the second segments.

In some aspects, UE 120 may perform a particular behavior with regard to the second segments. For example, UE 120 may keep a second segment when the second segment has a length greater than a threshold. For example, UE 120 may determine to keep the second segment when the second segment is two or more OFDM symbols long. In some aspects, UE 120 may rate match a transport block in the second segments. For example, UE 120 may keep all second segments and determine a transport block size based on a longest second segment of one or more second segments and rate match according to the determined transport block size. In another example, UE 120 may rate match according to a transport block size of a shortest second segment or an average of second segment lengths. In some aspects, UE 120 may discard one or more second segments. For example, UE 120 may keep only a longest second segment and may determine a transport block size for rate matching based on the length of the longest second segment.

As indicated above, FIG. 5 is provided as an example. Other examples may differ from what is described with respect to FIG. 5.

Figure 6:
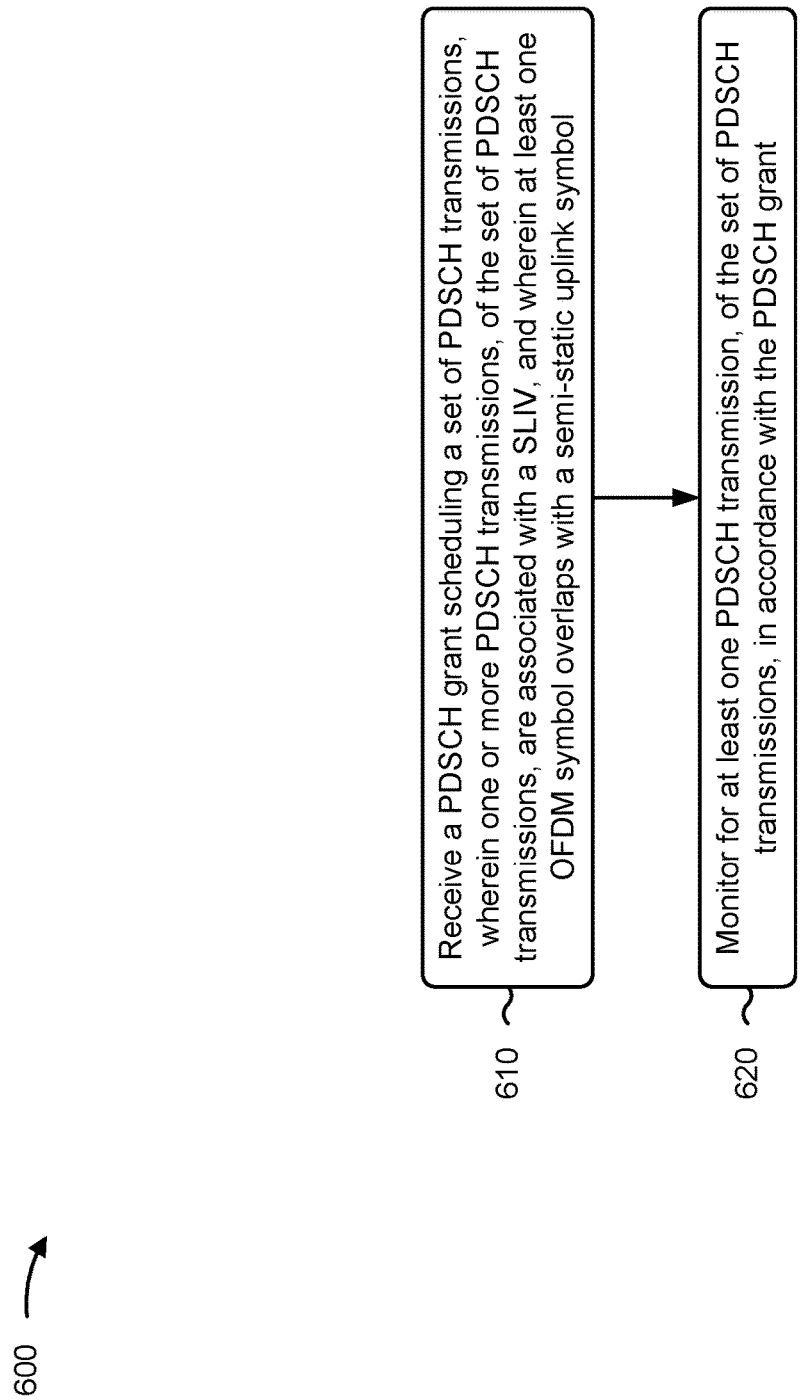
FIG. 6 is a diagram illustrating an example process associated with multi-PDSCH grant configuration, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with multi-PDSCH grant configuration.

As shown in FIG. 6, in some aspects, process 600 may include receiving a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol (block 610). For example, the UE (e.g., using reception component 702, depicted in FIG. 7) may receive a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol, as described above.

As further shown in FIG. 6, in some aspects, process 600 may include monitoring for at least one PDSCH transmission, of the set of PDSCH transmissions, in accordance with the PDSCH grant (block 620). For example, the UE (e.g., using monitoring component 708, depicted in FIG. 7) may monitor for at least one PDSCH transmission, of the set of PDSCH transmissions, in accordance with the PDSCH grant, as described above.

Process 600 may include additional aspects, such as any single aspect or any combination of aspects described below and/or in connection with one or more other processes described elsewhere herein.

In a first aspect, process 600 includes determining a scheduling error based at least in part on the at least one OFDM symbol conflicting with the semi-static uplink symbol.

In a second aspect, alone or in combination with the first aspect, process 600 includes canceling reception of the one or more PDSCH transmissions based at least in part on the at least one OFDM symbol overlapping with the semi-static uplink symbol, and wherein monitoring for the set of PDSCH transmissions comprises monitoring for at least one PDSCH transmission based at least in part on cancelling reception of the one or more PDSCH transmissions.

In a third aspect, alone or in combination with one or more of the first and second aspects, process 600 includes delaying reception of the one or more PDSCH transmissions and one or more scheduled PDSCH transmissions subsequent to the one or more PDSCH transmissions based at least in part on the at least one OFDM symbol overlapping with the semi-static uplink symbol, and wherein monitoring for the set of PDSCH transmissions comprises monitoring for the set of PDSCH transmissions based at least in part on delaying reception of the one or more PDSCH transmissions and the one or more scheduled PDSCH transmission subsequent to the one or more PDSCH transmissions.

In a fourth aspect, alone or in combination with one or more of the first through third aspects, delaying the reception comprises delaying the reception for one slot.

In a fifth aspect, alone or in combination with one or more of the first through fourth aspects, process 600 includes canceling reception of a last PDSCH transmission of the one or more PDSCH transmissions and one or more scheduled PDSCHs subsequent to the one or more PDSCH transmissions.

In a sixth aspect, alone or in combination with one or more of the first through fifth aspects, process 600 includes adjusting the SLIV of the one or more PDSCH transmissions based at least in part on the at least one OFDM symbol overlapping with the semi-static uplink symbol, and wherein monitoring for the set of PDSCH transmissions comprises monitoring for the set of PDSCH transmissions based at least in part on adjusting the SLIV.

In a seventh aspect, alone or in combination with one or more of the first through sixth aspects, adjusting the SLIV comprises segmenting a set of OFDM symbols identified by the SLIV into a set of segments, and skipping one or more segments for monitoring for the set of PDSCH transmissions.

In an eighth aspect, alone or in combination with one or more of the first through seventh aspects, process 600 includes rating matching a transport block for each of a set of non-skipping segments, wherein a size of the transport block is based at least in part on at least one of a length of a longest segment of the set of segments, a length of a shortest segment of the set of segments, or an average length of the set of segments.

In a ninth aspect, alone or in combination with one or more of the first through eighth aspects, process 600 includes rating matching a transport block only for a longest segment of the set of segments, wherein a transport block size is based at least in part on a length of the longest segment of the set of segments.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
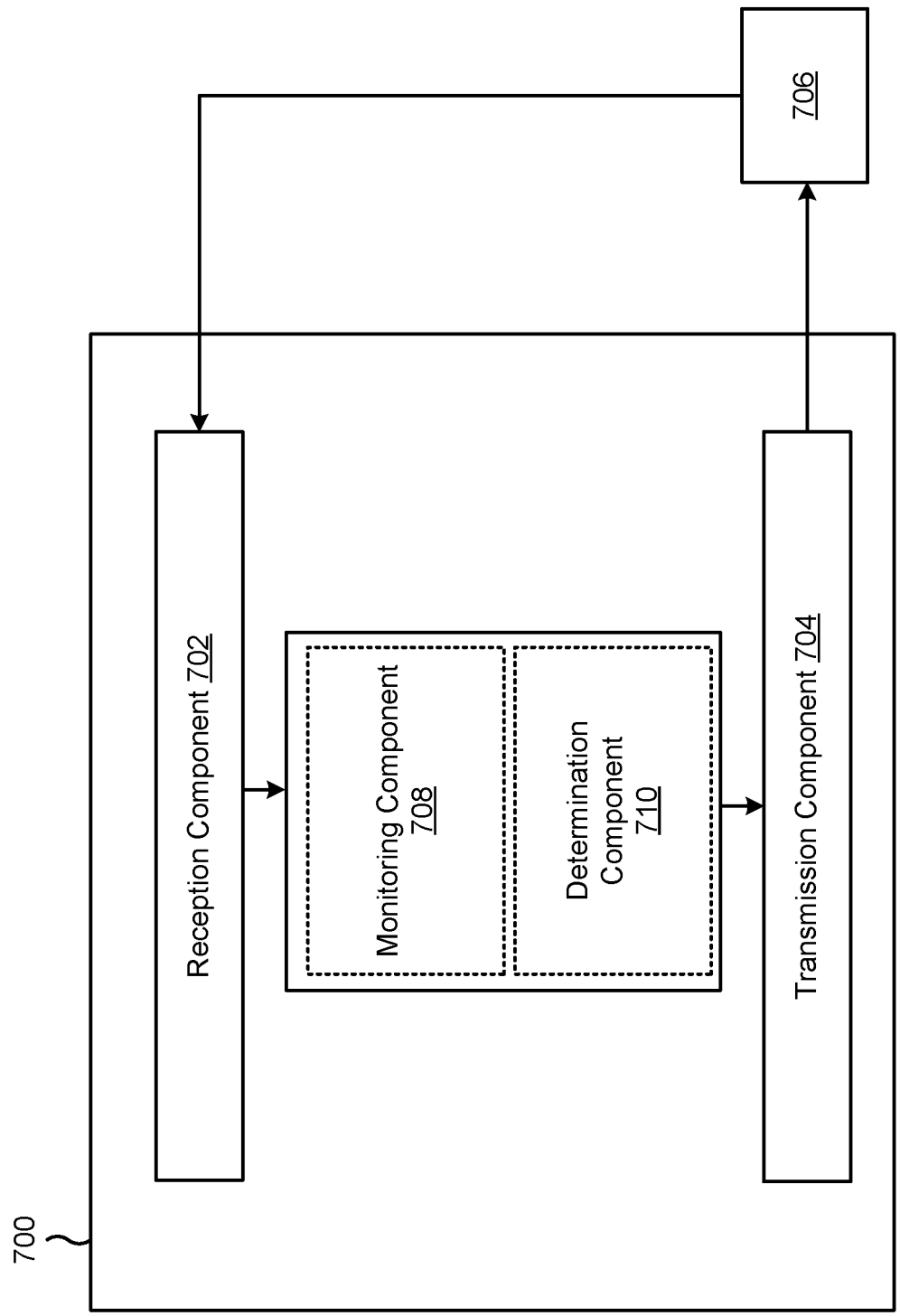
FIG. 7 is a diagram of an example apparatus for wireless communication, in accordance with various aspects of the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a monitoring component 708 or a determination component 710, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, among other examples. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol. The monitoring component 708 may monitor for at least one PDSCH transmission, of the set of PDSCH transmissions, in accordance with the PDSCH grant.

The determination component 710 may determine a scheduling error based at least in part on the at least one OFDM symbol conflicting with the semi-static uplink symbol.

The monitoring component 708 may cancel reception of the one or more PDSCH transmissions based at least in part on the at least one OFDM symbol overlapping with the semi-static uplink symbol.

The monitoring component 708 may delay reception of the one or more PDSCH transmissions and one or more scheduled PDSCH transmissions subsequent to the one or more PDSCH transmissions based at least in part on the at least one OFDM symbol overlapping with the semi-static uplink symbol.

The monitoring component 708 may cancel reception of a last PDSCH transmission of the one or more PDSCH transmissions and one or more scheduled PDSCHs subsequent to the one or more PDSCH transmissions.

The determination component 710 may adjust the SLIV of the one or more PDSCH transmissions based at least in part on the at least one OFDM symbol overlapping with the semi-static uplink symbol.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
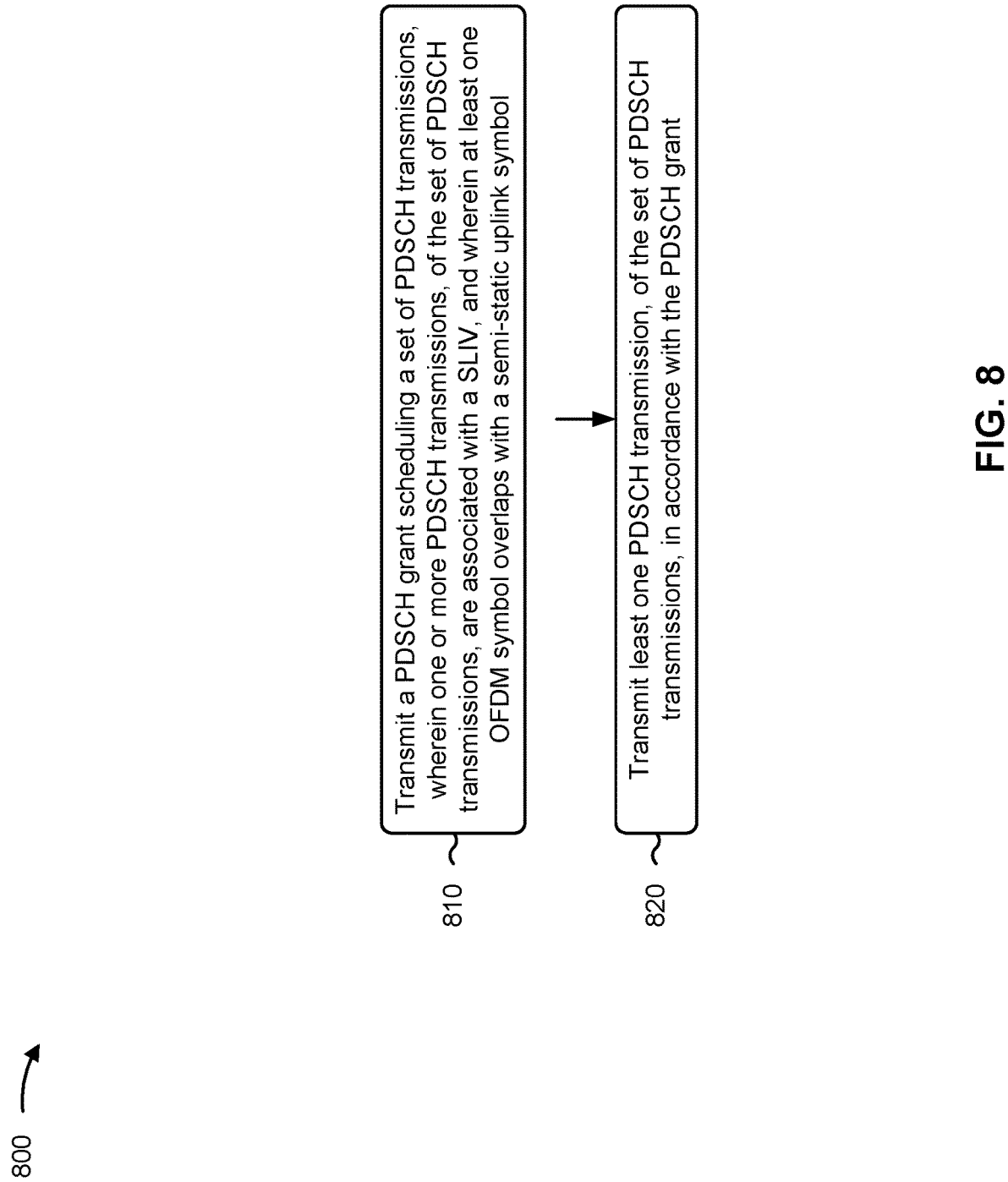
FIG. 8 is a diagram illustrating an example process associated with multi-PDSCH grant configuration, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110) performs operations associated with multi-PDSCH grant configuration.

As shown in FIG. 8, in some aspects, process 800 may include transmitting a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol (block 810). For example, the base station (e.g., using transmission component 904, depicted in FIG. 9) may transmit a PDSCH grant scheduling a set of PDSCH transmissions, wherein one or more PDSCH transmissions, of the set of PDSCH transmissions, are associated with a SLIV, and wherein at least one OFDM symbol overlaps with a semi-static uplink symbol, as described above.

As further shown in FIG. 8, in some aspects, process 800 may include transmitting at least one PDSCH transmission, of the set of PDSCH transmissions, in accordance with the PDSCH grant (block 820). For example, the base station (e.g., using transmission component 904, depicted in FIG. 9) may transmit at least one PDSCH transmission, of the set of PDSCH transmissions, in accordance with the PDSCH grant, as described above.

Process 800 may include additional aspects, such as any single aspect or any combination of aspects described below and/or in connection with one or more other processes described elsewhere herein.

In a first aspect, process 800 includes determining a scheduling error based at least in part on the at least one OFDM symbol conflicting with the semi-static uplink symbol.

In a second aspect, alone or in combination with the first aspect, process 800 includes canceling transmission of the one or more PDSCH transmissions based at least in part on the at least one OFDM symbol overlapping with the semi-static uplink symbol, and wherein the one or more processors, when transmitting the set of PDSCH transmissions, are configured to transmitting at least one PDSCH transmission based at least in part on cancelling transmission of the one or more PDSCH transmissions.

In a third aspect, alone or in combination with one or more of the first and second aspects, process 800 includes delaying transmission of the one or more PDSCH transmissions and one or more scheduled PDSCH transmissions subsequent to the one or more PDSCH transmissions based at least in part on the at least one OFDM symbol overlapping with the semi-static uplink symbol, and wherein the one or more processors, when transmitting the set of PDSCH transmissions, are configured to transmitting the set of PDSCH transmissions based at least in part on delaying reception of the one or more PDSCH transmissions and the one or more scheduled PDSCH transmissions subsequent to the one or more PDSCH transmissions.

In a fourth aspect, alone or in combination with one or more of the first through third aspects, process 800 includes delaying the transmission for one slot.

In a fifth aspect, alone or in combination with one or more of the first through fourth aspects, process 800 includes canceling transmission of a last PDSCH transmission of the one or more PDSCH transmissions and one or more scheduled PDSCHs subsequent to the one or more PDSCH transmissions.

In a sixth aspect, alone or in combination with one or more of the first through fifth aspects, process 800 includes adjusting the SLIV of the one or more PDSCH transmissions based at least in part on the at least one OFDM symbol overlapping with the semi-static uplink symbol, and wherein the one or more processors, when transmitting the set of PDSCH transmissions, are configured to transmitting the set of PDSCH transmissions based at least in part on adjusting the SLIV.

In a seventh aspect, alone or in combination with one or more of the first through sixth aspects, process 800 includes segmenting a set of OFDM symbols identified by the SLIV into a set of segments, and skipping one or more segments for transmission for the set of PDSCH transmissions.

In an eighth aspect, alone or in combination with one or more of the first through seventh aspects, process 800 includes rating match a transport block for each of a set of non-skipping segments, wherein a size of the transport block is based at least in part on at least one of a length of a longest segment of the set of segments, a length of a shortest segment of the set of segments, or an average length of the set of segments.

In a ninth aspect, alone or in combination with one or more of the first through eighth aspects, process 800 includes rating match a transport block only for a longest segment of the set of segments, wherein a transport block size is based at least in part on a length of the longest segment of the set of segments.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
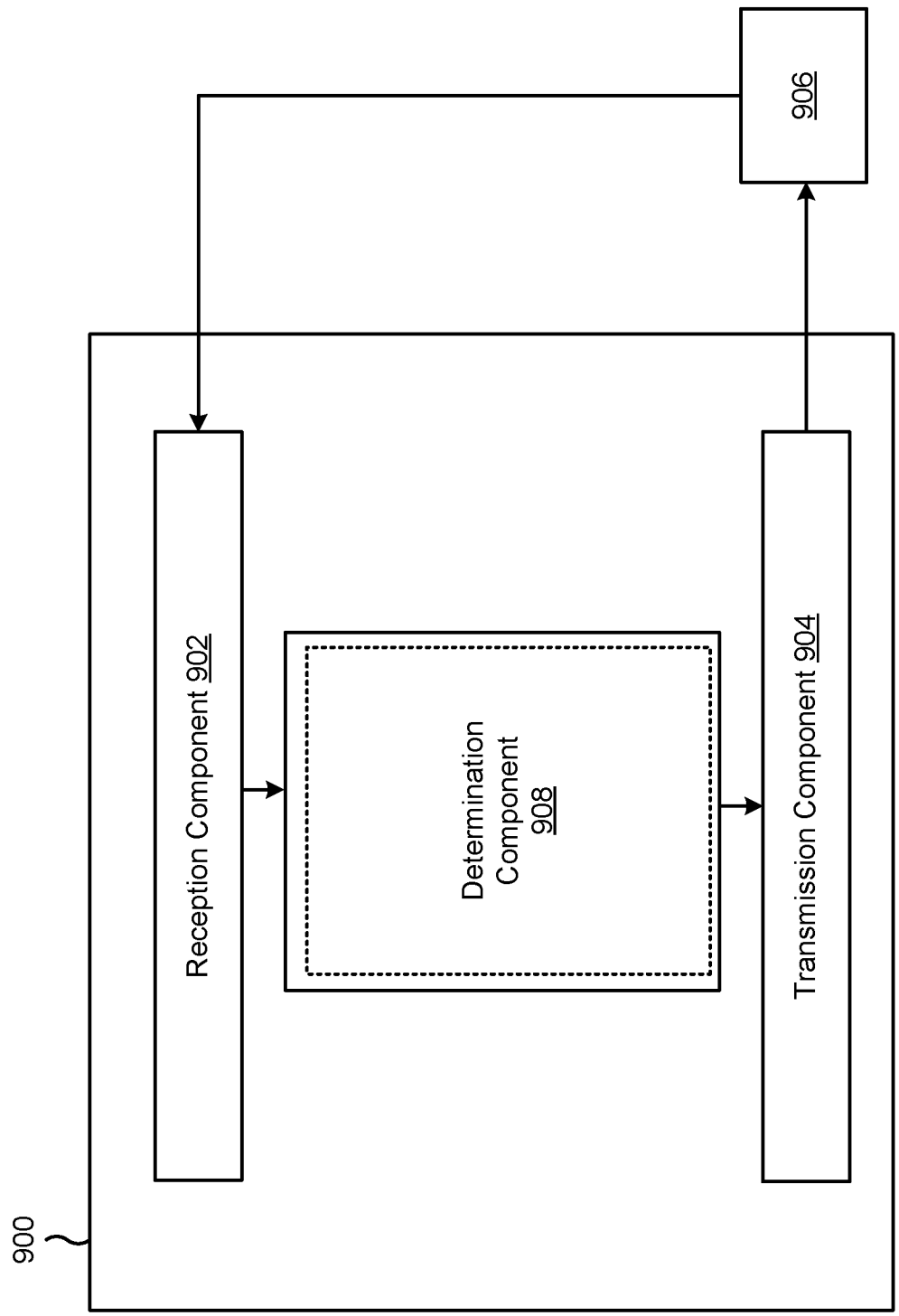
FIG. 9 is a diagram of an example apparatus for wireless communication, in accordance with various aspects of the present disclosure.

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 800 of FIG. 8, among other examples. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The determination component 908 may determine a scheduling error, cancel a transmission, delay a transmission, among other examples, as described above. In some aspects, the determination component may include a transmit processor, a controller/processor, a memory, or a combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising receiving a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and monitoring for at least one PDSCH transmission, of the set of PDSCH transmissions, in accordance with the PDSCH grant.

Aspect 2: The method of aspect 1, further comprising: determining a scheduling error based at least in part on the at least one OFDM symbol conflicting with the semi-static uplink symbol.

Aspect 3: The method of aspect 1, further comprising: canceling reception of the one or more PDSCH transmissions based at least in part on the at least one OFDM symbol overlapping with the semi-static uplink symbol; and wherein monitoring for the set of PDSCH transmissions comprises: monitoring for at least one PDSCH transmission based at least in part on cancelling reception of the one or more PDSCH transmissions. wherein monitoring for the set of PDSCH transmissions comprises monitoring for at least one PDSCH transmission based at least in part on cancelling reception of the one or more PDSCH transmissions.

Aspect 4: The method of aspect 1, further comprising delaying reception of the one or more PDSCH transmissions and one or more scheduled PDSCH transmissions subsequent to the one or more PDSCH transmissions based at least in part on the at least one OFDM symbol overlapping with the semi-static uplink symbol; and wherein monitoring for the set of PDSCH transmissions comprises monitoring for the set of PDSCH transmissions based at least in part on delaying reception of the one or more PDSCH transmissions and the one or more scheduled PDSCH transmission subsequent to the one or more PDSCH transmissions, wherein monitoring for the set of PDSCH transmissions comprises monitoring for the set of PDSCH transmissions based at least in part on delaying reception of the one or more PDSCH transmissions and the one or more scheduled PDSCH transmission subsequent to the one or more PDSCH transmissions.

Aspect 5: The method of aspect 4, wherein delaying the reception comprises delaying the reception for one slot.

Aspect 6: The method of aspect 1, further comprising canceling reception of a last PDSCH transmission of the one or more PDSCH transmissions and one or more scheduled PDSCHs subsequent to the one or more PDSCH transmissions.

Aspect 7: The method of aspect 1, further comprising adjusting the SLIV of the one or more PDSCH transmissions based at least in part on the at least one OFDM symbol overlapping with the semi-static uplink symbol; and wherein monitoring for the set of PDSCH transmissions comprises: monitoring for the set of PDSCH transmissions based at least in part on adjusting the SLIV, wherein monitoring for the set of PDSCH transmissions comprises monitoring for the set of PDSCH transmissions based at least in part on adjusting the SLIV.

Aspect 8: The method of aspect 7, wherein adjusting the SLIV comprises: segmenting a set of OFDM symbols identified by the SLIV into a set of segments; and skipping one or more segments for monitoring for the set of PDSCH transmissions.

Aspect 9: The method of aspect 8, further comprising: rate matching a transport block for each of a set of non-skipping segments, wherein a size of the transport block is based at least in part on at least one of: a length of a longest segment of the set of segments, a length of a shortest segment of the set of segments, or an average length of the set of segments.

Aspect 10: The method of aspect 8, further comprising rate matching a transport block only for a longest segment of the set of segments, wherein a transport block size is based at least in part on a length of the longest segment of the set of segments.

Aspect 11: A method of wireless communication performed by a user equipment (UE), comprising transmitting a physical downlink shared channel (PDSCH) grant scheduling a set of PDSCH transmissions, wherein one or more PDSCH transmissions, of the set of PDSCH transmissions, are associated with a size and length indicator value (SLIV), and wherein at least one orthogonal frequency division multiplexing (OFDM) symbol overlaps with a semi-static uplink symbol; and transmitting at least one PDSCH transmission, of the set of PDSCH transmissions, in accordance with the PDSCH grant.

Aspect 12: The method of aspect 11, further comprising: determining a scheduling error based at least in part on the at least one OFDM symbol conflicting with the semi-static uplink symbol.

Aspect 13: The method of aspect 11, further comprising: canceling transmission of the one or more PDSCH transmissions based at least in part on the at least one OFDM symbol overlapping with the semi-static uplink symbol; and wherein transmitting the set of PDSCH transmissions comprises: transmitting at least one PDSCH transmission based at least in part on cancelling transmission of the one or more PDSCH transmissions.

Aspect 14: The method of aspect 11, further comprising delaying transmission of the one or more PDSCH transmissions and one or more scheduled PDSCH transmissions subsequent to the one or more PDSCH transmissions based at least in part on the at least one OFDM symbol overlapping with the semi-static uplink symbol; and wherein transmitting the set of PDSCH transmissions comprises transmitting the set of PDSCH transmissions based at least in part on delaying transmission of the one or more PDSCH transmissions and the one or more scheduled PDSCH transmission subsequent to the one or more PDSCH transmissions.

Aspect 15: The method of aspect 14, wherein delaying the transmission comprises delaying the transmission for one slot.

Aspect 16: The method of aspect 11, further comprising canceling transmission of a last PDSCH transmission of the one or more PDSCH transmissions and one or more scheduled PDSCHs subsequent to the one or more PDSCH transmissions.

Aspect 17: The method of aspect 11, further comprising adjusting the SLIV of the one or more PDSCH transmissions based at least in part on the at least one OFDM symbol overlapping with the semi-static uplink symbol; and wherein transmitting the set of PDSCH transmissions comprises: transmitting the set of PDSCH transmissions based at least in part on adjusting the SLIV.

Aspect 18: The method of aspect 17, wherein adjusting the SLIV comprises: segmenting a set of OFDM symbols identified by the SLIV into a set of segments; and skipping one or more segments for transmitting the set of PDSCH transmissions.

Aspect 19: The method of aspect 18, further comprising: rate matching a transport block for each of a set of non-skipping segments, wherein a size of the transport block is based at least in part on at least one of: a length of a longest segment of the set of segments, a length of a shortest segment of the set of segments, or an average length of the set of segments.

Aspect 20: The method of aspect 18, further comprising rate matching a transport block only for a longest segment of the set of segments, wherein a transport block size is based at least in part on a length of the longest segment of the set of segments.

Aspect 21: An apparatus for wireless communication at a device, comprising a processor; memory coupled with the processor; and instructions stored in the memory and executable by the processor to cause the apparatus to perform the method of one or more aspects of aspects 1-10.

Aspect 22: A device for wireless communication, comprising a memory and one or more processors coupled to the memory, the memory and the one or more processors configured to perform the method of one or more aspects of aspects 1-10.

Aspect 23: An apparatus for wireless communication, comprising at least one means for performing the method of one or more aspects of aspects 1-10.

Aspect 24: A non-transitory computer-readable medium storing code for wireless communication, the code comprising instructions executable by a processor to perform the method of one or more aspects of aspects 1-10.

Aspect 25: A non-transitory computer-readable medium storing a set of instructions for wireless communication, the set of instructions comprising one or more instructions that, when executed by one or more processors of a device, cause the device to perform the method of one or more aspects of aspects 1-10.

Aspect 26: An apparatus for wireless communication at a device, comprising a processor; memory coupled with the processor; and instructions stored in the memory and executable by the processor to cause the apparatus to perform the method of one or more aspects of aspects 11-20.

Aspect 27: A device for wireless communication, comprising a memory and one or more processors coupled to the memory, the memory and the one or more processors configured to perform the method of one or more aspects of aspects 11-20.

Aspect 28: An apparatus for wireless communication, comprising at least one means for performing the method of one or more aspects of aspects 11-20.

Aspect 29: A non-transitory computer-readable medium storing code for wireless communication, the code comprising instructions executable by a processor to perform the method of one or more aspects of aspects 11-20.

Aspect 30: A non-transitory computer-readable medium storing a set of instructions for wireless communication, the set of instructions comprising one or more instructions that, when executed by one or more processors of a device, cause the device to perform the method of one or more aspects of aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to cause the UE to:
      receive a physical downlink shared channel (PDSCH) grant for scheduling a set of PDSCH transmissions;
      delay reception of a PDSCH transmission of the set of PDSCH transmissions, and one or more scheduled PDSCH transmissions that are scheduled subsequent to the PDSCH transmission, based at least in part on at least one orthogonal frequency division multiplexing (OFDM) symbol of the PDSCH transmission being overlapped with a semi-static uplink symbol associated with the UE; and
      cancel reception of a last PDSCH transmission of the one or more scheduled PDSCH transmissions based at least in part on the at least one OFDM symbol being overlapped with the semi-static uplink symbol.

2. The UE of claim 1, wherein the one or more processors are further configured to cause the UE to:
   monitor for at least one PDSCH transmission, of the set of PDSCH transmissions, based at least in part on the delay.

3. The UE of claim 1, wherein the one or more processors, to cause the UE to delay the reception, are configured to cause the UE to:
   delay the reception for one slot.

4. The UE of claim 1, wherein the one or more processors are further configured to cause the UE to:
   adjust a SLIV of the PDSCH transmission based at least in part on the at least one OFDM symbol being overlapped with the semi-static uplink symbol; and
   wherein the one or more processors are further configured to cause the UE to:
      monitor for at least one PDSCH transmission, of the set of PDSCH transmissions, based at least in part on the adjusted SLIV.

5. The UE of claim 4, wherein the one or more processors, to cause the UE to adjust the SLIV, are configured to cause the UE to:
   segment a set of OFDM symbols identified by the SLIV into a set of segments; and
   skip one or more segments for monitoring for the at least one PDSCH transmission.

6. The UE of claim 5, wherein the one or more processors are further configured to cause the UE to:

rate match a transport block for each of a set of non-skipping segments, wherein a size of the transport block is based at least in part on at least one of:
a length of a longest segment of the set of segments,
a length of a shortest segment of the set of segments, or
an average length of the set of segments.

7. The UE of claim 1, wherein the one or more processors, to cause the UE to delay reception of the PDSCH transmission and the one or more scheduled PDSCH transmissions, are further configured to cause the UE to:
delay the reception of the PDSCH transmission, and the one or more scheduled PDSCH transmissions, such that HARQ process IDs of the PDSCH transmission, and the one or more scheduled PDSCH transmissions, are to be incrementally received.

8. The UE of claim 1, wherein the PDSCH grant is included in a downlink control information (DCI) communication.

9. The UE of claim 8, wherein the DCI communication indicates sequential HARQ process IDs for the set of PDSCH transmissions.

10. The UE of claim 1, wherein the one or more scheduled PDSCH transmissions comprise multiple PDSCH transmissions.

11. A base station for wireless communication, comprising:
a memory; and
one or more processors coupled to the memory, the one or more processors configured to cause the base station to:
transmit a physical downlink shared channel (PDSCH) grant for scheduling a set of PDSCH transmissions;
delay transmission of a PDSCH transmission of the set of PDSCH transmissions, and one or more scheduled PDSCH transmissions that are scheduled subsequent to the PDSCH transmission, based at least in part on at least one orthogonal frequency division multiplexing (OFDM) symbol of the PDSCH transmission being overlapped with a semi-static uplink symbol associated with a user equipment (UE); and
cancel transmission of a last PDSCH transmission of the one or more scheduled PDSCH transmissions based at least in part on the at least one OFDM symbol being overlapped with the semi-static uplink symbol.

12. The base station of claim 11, wherein the one or more processors are further configured to cause the base station to:
transmit the set of PDSCH transmissions based at least in part on the delay.

13. The base station of claim 11, wherein the one or more processors, to cause the base station to delay the transmission, are configured to cause the base station to:
delay the transmission for one slot.

14. The base station of claim 11, wherein the one or more processors are further configured to cause the base station to:
adjust a SLIV of the PDSCH transmission based at least in part on the at least one OFDM symbol being overlapped with the semi-static uplink symbol; and
wherein the one or more processors are further configured to cause the base station to:
transmit the set of PDSCH transmissions based at least in part on the adjusted SLIV.

15. The base station of claim 14, wherein the one or more processors, to cause the base station to adjust the SLIV, are configured to cause the base station to:
segment a set of OFDM symbols identified by the SLIV into a set of segments; and
skip one or more segments for at least one PDSCH transmission of the set of PDSCH transmissions.

16. The base station of claim 15, wherein the one or more processors are further configured to cause the base station to:
rate match a transport block for each of a set of non-skipping segments, wherein a size of the transport block is based at least in part on at least one of:
a length of a longest segment of the set of segments,
a length of a shortest segment of the set of segments, or
an average length of the set of segments.

17. The base station of claim 11, wherein the one or more processors, to cause the base station to delay transmission of the PDSCH transmission and the one or more scheduled PDSCH transmissions, are further configured to cause the base station to:
delay the transmission of the PDSCH transmission, and the one or more scheduled PDSCH transmissions, such that HARQ process IDs of the PDSCH transmission, and the one or more scheduled PDSCH transmissions, are to be incrementally received.

18. The base station of claim 11, wherein the PDSCH grant is included in a downlink control information (DCI) communication.

19. The base station of claim 11, wherein the one or more scheduled PDSCH transmissions comprise multiple PDSCH transmissions.

20. A method of wireless communication performed by a user equipment (UE), comprising:
receiving a physical downlink shared channel (PDSCH) grant scheduling a set of PDSCH transmissions; and
delaying reception of a PDSCH transmission of the set of PDSCH transmissions, and one or more scheduled PDSCH transmissions that are scheduled subsequent to the PDSCH transmission, based at least in part on at least one orthogonal frequency division multiplexing (OFDM) symbol of the PDSCH transmission overlapping with a semi-static uplink symbol associated with the UE; and
canceling reception of a last PDSCH transmission of the one or more scheduled PDSCH transmissions based at least in part on the at least one OFDM symbol being overlapped with the semi-static uplink symbol.

21. The method of claim 20, further comprising:
monitoring for at least one PDSCH transmission, of the set of PDSCH transmissions, based at least in part on delaying the reception.

22. The method of claim 20, wherein delaying the reception comprises:
delaying the reception for one slot.

23. The method of claim 20, further comprising:
adjusting a SLIV of the PDSCH transmission based at least in part on the at least one OFDM symbol overlapping with the semi-static uplink symbol; and
wherein the method further comprises:
monitoring for at least one PDSCH transmission, of the set of PDSCH transmissions, based at least in part on adjusting the SLIV.

24. The method of claim 23, wherein adjusting the SLIV comprises:
segmenting a set of OFDM symbols identified by the SLIV into a set of segments; and
skipping one or more segments for monitoring for the at least one PDSCH transmission.

25. The method of claim 20, wherein delaying reception of the PDSCH transmission and the one or more scheduled PDSCH transmissions comprises:
delaying the reception of the PDSCH transmission, and the one or more scheduled PDSCH transmissions, such that HARQ process IDs of the PDSCH transmission, and the one or more scheduled PDSCH transmissions, are to be incrementally received.

26. The method of claim 20, wherein the PDSCH grant is included in a downlink control information (DCI) communication.

27. The method of claim 20, wherein the one or more scheduled PDSCH transmissions comprise multiple PDSCH transmissions.

28. A method of wireless communication performed by a base station, comprising:
    transmitting a physical downlink shared channel (PDSCH) grant scheduling a set of PDSCH transmissions; and
    delaying transmission of a PDSCH transmission of the set of PDSCH transmissions, and one or more scheduled PDSCH transmissions that are scheduled subsequent to the PDSCH transmission, based at least in part on at least one orthogonal frequency division multiplexing (OFDM) symbol of the PDSCH transmission overlapping with a semi-static uplink symbol associated with a user equipment (UE); and
    canceling transmission of a last PDSCH transmission of the one or more scheduled PDSCH transmissions based at least in part on the at least one OFDM symbol being overlapped with the semi-static uplink symbol.

29. The method of claim 28, wherein delaying the transmission of the PDSCH transmission and the one or more scheduled PDSCH transmissions comprises:
    delaying the transmission of the PDSCH transmission, and the one or more scheduled PDSCH transmissions, such that HARQ process IDs of the PDSCH transmission, and the one or more scheduled PDSCH transmissions, are to be incrementally received.

30. The method of claim 28, wherein the PDSCH grant is included in a downlink control information (DCI) communication.

* * * * *